Dec. 6, 1938.   G. W. MARSHALL   2,139,167
BOLT ANCHOR
Filed June 24, 1938
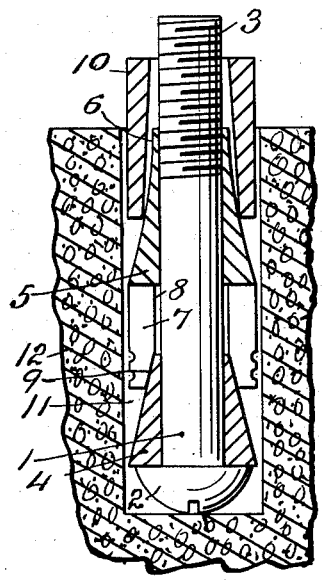
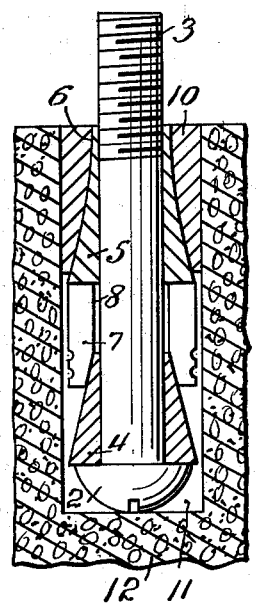
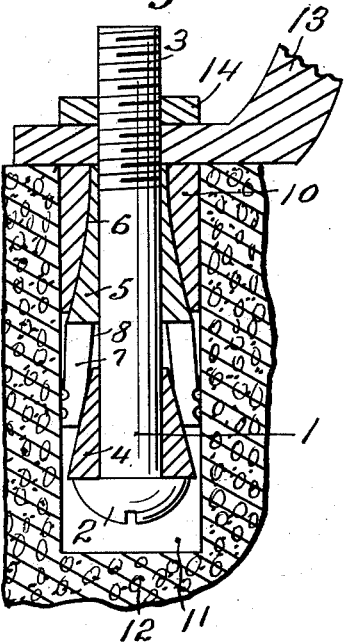
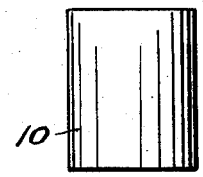
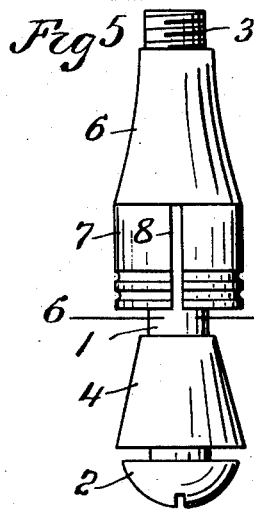
Inventor
George W. Marshall
By Warren D. House
His Attorney

UNITED STATES PATENT OFFICE 2,139,167

BOLT ANCHOR

George W. Marshall, Blue Springs, Mo.

Application June 24, 1938, Serial No. 215,635

4 Claims. (Cl. 85—2.4)

My invention relates to improvements in bolt anchors, of the type adapted for insertion in hard material, such as concrete, tile, brick work or cement, for any desired anchoring means, as fastening seats to a floor of hard material.

One of the objects of my invention is the provision of a bolt anchor of the kind described which is simple, cheap, strong, durable, not likely to get out of order, which is easily and quickly set into operative position, which will hold the bolt from lateral swinging or loosening, and which is otherwise efficient in operation.

The novel features of my invention are hereinafter fully described and claimed.

In the accompanying drawing which illustrates my invention,

Fig. 1 is a view partly in vertical section and partly in side elevation of one form of my invention with the parts shown assembled in a hole in a concrete floor ready for being tightened therein.

Fig. 2 is a view similar to Fig. 1, showing the soft metal tube driven in the hole to a holding position.

Fig. 3 is a view similar to Fig. 2 showing part of a seat leg fastened by the anchor to the floor, and the bolt drawn upwardly by the nut to a position in which the wedge has expanded the slotted sleeve into holding engagement with the concrete.

Fig. 4 is a side elevation of what is shown in Fig. 3, the concrete being shown in vertical section.

Fig. 5 is a side elevation showing the different elements, the wedge and sleeve being shown separated and mounted on the bolt.

Fig. 6 is a section on the line 6—6 of Fig. 5.

Fig. 7 is an elevation of a modified form of bolt in which the wedging means is a part of the bolt.

Similar characters of reference designate similar parts in the different views.

Referring to Figs. 1 to 6, 1 designates an ordinary bolt having a head 2 and a threaded portion 3.

4 designates a tubular wedge having the form of a frustum of a cone, and disposed on the bolt with its end of larger diameter resting on the head 2 of the bolt.

Slidably fitted on the bolt 1 is a sleeve 5 of a tough relatively hard metal, such as malleable iron, the outer end portion 6 converging outwardly, and the inner end portion 7 being provided with longitudinal slots 8 and being normally substantially cylindrical. The inner end portion 7 has an inner wall portion 9, which converges outwardly and is fitted for a substantial distance longitudinally on the upper end portion of the wedge 4, and which wall portion 9 is of the same convergence as the wedge.

10 is a soft metal tube, such as lead, the tube being cylindrical and having an outwardly converging inner wall fitted on the converging end portion 6 of the sleeve.

The parts, assembled as just described, are inserted into a hole 11 provided in the concrete floor 12, the head 2 of the bolt being disposed on the bottom of the hole 11, and the threaded portion 3 of the bolt projecting the required distance above the floor, as shown in Fig. 1.

The lead tube 10 is then driven into the hole 11 and expanded by the converging portion 6 of the sleeve into tight engagement with the concrete 12, as shown in Fig. 2.

The leg 13, or other device which is to be anchored to the floor 12, is then placed on the floor with the threaded portion 3 of the bolt extending through and above it, after which a nut 14 is screwed onto the bolt and against the leg 13. Continued screwing of the nut 14 on the bolt will draw the latter upwardly, thus forcing the wedge 4 further into the slotted portion 7, and expanding the latter into tight engagement with the concrete 12, whereby the bolt and leg 13 are tightly anchored to the floor 12.

By having the sleeve 5 a tough metal, it can be expanded without cracking, and by having it a relatively hard metal, it will effect a more secure engagement with the concrete, and will hold the bolt more securely against lateral tipping or loosening, that would be the case were the sleeve of a soft metal. Also by being hard and unyielding, when the lead tube is driven into the hole, the lead will be forced against the concrete with a maximum pressure, and will thereby effect a more secure anchoring of the upper portion of the bolt.

In the form of bolt shown in Fig. 7, the head 15 of the bolt is of the form of the frustum of a cone, converging upwardly, thereby forming a wedging means for expanding the slotted portion 7 of the sleeve, the wedging means being an integral part of the bolt instead of a separate member, as is the wedge 4. In this form of my invention the parts are assembled similarly to their arrangement in the form shown in Figs. 1 to 4, the slotted portion of the sleeve being fitted in the same manner to the converging outer periphery of the head 15. Thus assembled in the hole in the concrete, the lead tube is driven in and the head 15 of the bolt drawn into and expanding the slotted portion 7 of the sleeve, in the same manner as has been described, with reference to the other form of my invention.

Other modifications, within the scope of the appended claims, may be made without departing from the spirit of my invention.

What I claim is:—

1. In an anchoring device of the kind described, in combination, an anchoring member adapted for insertion into a hole in hard material, outwardly converging wedging means on and movable longitudinally with said anchoring member, a sleeve of tough relatively hard metal having a longitudinally slotted inner end portion encircling and spaced from said member and embracing said converging wedging means and expansible thereby against said hard material when said member is forced outwardly, said sleeve having an outwardly converging outer end portion slidably fitted on said member, a soft metal tube embracing said outwardly converging end portion, and, when driven in said hole being expansible by said outwardly converging outer end portion against said hard material, and means for forcing said member outwardly.

2. In an anchoring device of the kind described, in combination, an anchoring member adapted for insertion into a hole in hard material, outwardly converging wedging means on and movable longitudinally with said anchoring member, a sleeve of tough relatively hard metal having a longitudinally slotted inner end portion encircling and spaced from said member, the inner wall of which inner end portion has like convergence and is closely fitted for a substantial distance longitudinally on said converging wedging means and expansible thereby against said hard material when said anchoring member is forced outwardly, said sleeve having an outwardly converging outer end portion slidably fitted on said member, a soft metal tube embracing said outwardly converging outer end portion and expansible thereby, when driven in said hole, against said hard material, and means for drawing said member outwardly.

3. In an anchoring device of the kind described, in combination, a bolt, adapted for insertion into a hole in hard material with a head at the inner end and a threaded portion projecting outwardly from said hole, a tubular outwardly converging wedge fitted on said bolt and bearing against the head thereof, a sleeve of tough relatively hard metal having a longitudinally slotted inner end portion encircling and spaced from said member and embracing the converging portion of said wedge and adapted to be expanded thereby against the hard material around the hole when said bolt is forced outwardly, said sleeve having an outwardly converging outer end portion, slidably fitted on said member, a soft metal tube embracing said outwardly converging outer end portion of said sleeve and when driven inwardly in said hole being expanded and adapted to bear against the wall of said hole, and means including a nut fitted on said threaded portion for drawing said member outwardly.

4. In an anchoring device of the kind described, in combination, a bolt, adapted for insertion into a hole in hard material, with a head at its inner end and a threaded outer end portion being adapted to project from said hole, a tubular outwardly converging wedge fitted on said bolt against said head, a sleeve of tough relatively hard metal having a longitudinally sloted inner end portion encircling and spaced from said member, the inner wall of which inner end portion has like convergence and is closely fitted for a substantial distance longitudinally on said converging wedge, and is expanded thereby against said hard material when said wedge and bolt are forced outwardly, said sleeve having an outwardly converging outer end portion slidably fitted on said member, a soft metal tube embracing said outwardly converging outer end portion and expanded thereby against said hard material when driven inwardly in said hole, and means including a nut fitted on said threaded portion for drawing said member outwardly.

GEORGE W. MARSHALL.